K. D. STEVENSON.
FASTENING.
APPLICATION FILED MAR. 16, 1912.
1,055,294. Patented Mar. 4, 1913.
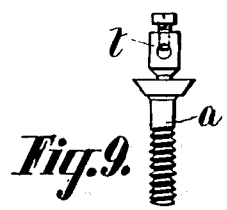
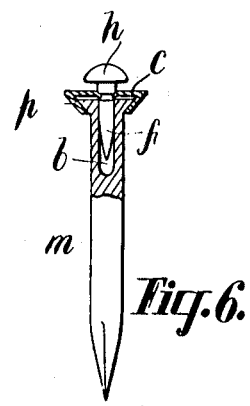
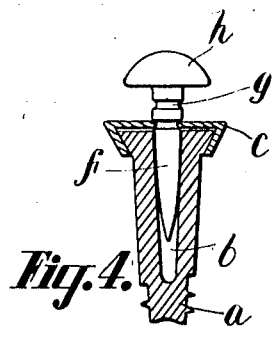
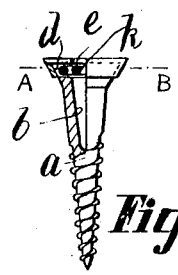
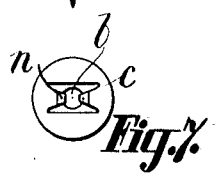
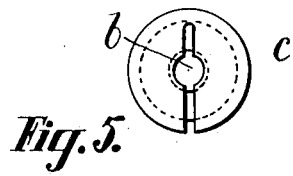
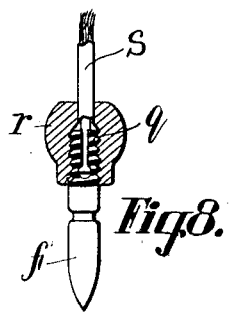
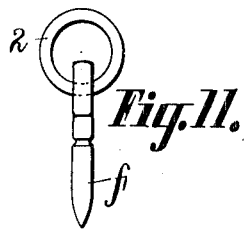
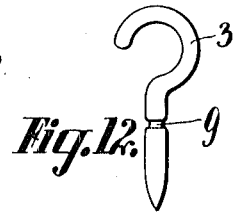
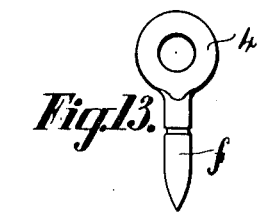
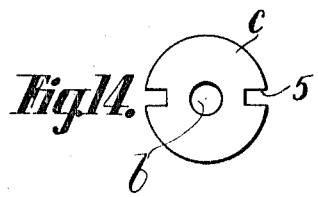
Witnesses
Inventor
Kate D. Stevenson

UNITED STATES PATENT OFFICE.

KATE DRUSILLA STEVENSON, OF LONDON, ENGLAND.

FASTENING.

1,055,294. Specification of Letters Patent. Patented Mar. 4, 1913.

Application filed March 16, 1912. Serial No. 684,249.

*To all whom it may concern:*

Be it known that I, KATE DRUSILLA STEVENSON, a subject of the King of England, residing at 2 Porchester Houses, Porchester Square, London, England, have invented certain new and useful Improvements in Fastenings; and I do hereby declare the following to be a full, clear, and exact description of the invention, such as will enable others skilled in the art to which it appertains to make and use the same.

This invention relates to a fastening device and refers more particularly to devices of the description in which the fastening is composed of a screw or nail provided with a head and a central bore and of an inner pin adapted to be inserted into the bore of the screw or nail with locking means between the screw or nail and the pin for the purpose of locking the same in position.

My present invention consists in providing in connection with the head of the screw or nail portion a cap fixed to the head of the screw or nail, a spring or equivalent locking means being inserted beneath the cap, or the cap itself in some cases forming or being provided with locking means. And in order that my said invention may be better understood, I will now proceed to describe, by way of example, various methods of carrying the same into effect with reference to the accompanying drawing:—

Figure 1 shows a screw fitted with a cap and a spring partly in section; Fig. 2 shows a pin for engagement therewith; Fig. 3 shows section on line A, B, Fig. 1; Fig. 4 shows a portion of the screw and pin of another form of my invention; Fig. 5 shows a plan of the screw of this form; Fig. 6 shows a further modification applied to a nail; Fig. 7 shows a plan of the cap of same; Fig. 8 shows in part sectional elevation the pin portion of my device-in combination with means for attaching an electric wire or the like thereto; Fig. 9 shows a metal screw having my invention applied thereto the pin portion being formed with an electric terminal; Figs. 10 to 13 show other modified forms of the pin portion of the device; Fig. 14 shows plan of a modified form of cap.

Referring to Figs. 1, 2, and 3 $a$ shows the body of the screw which is provided with a hole $b$. $c$ shows the cap. This cap is furnished with a slot $d$ in which the screw driver engages and with a hole $e$ through which the pin $f$ passes. This pin $f$ is provided with an annular groove $g$ and a head $h$. $k$ is a spring coming beneath the hole $e$, the spring $k$ being arranged in a recess within the head of the screw $a$. When using this form of device after the screw $a$ has been screwed into position the pin $f$ is passed through the hole $e$. It also passes through the spring $k$ opening it out until such spring closes around the groove $g$ when the pin is held in position.

Referring to Figs. 4 and 5 in these views the parts are similar to those shown and described with reference to Figs. 1 to 3 but in this case the spring $k$ is dispensed with and the cap $c$ is formed springy. The pin $f$ is also shown provided with two grooves $g$. The slot in the cap may be partial or extend across the cap. In using this form of device the pin $f$ is inserted into the hole $e$ and the cap is gradually opened out until one or other of the grooves is held by the two parts of the cap $c$ springing together.

In Figs. 6 and 7 in place of the screw $a$, a nail $m$ is shown fitted with my invention. In this case the cap $c$ is provided with two inwardly and downwardly projecting tongues $n$ which snap into the groove $g$ when the pin $f$ is inserted. It will be seen that the cap $c$ comprises a flange $p$ which is bent over so as to conform to and engage with the under part of the head of the screw or nail to give extra spring and also prevent the cap twisting away from the groove.

Referring to Fig. 8 in this case the top of the pin $f$ is formed with a split tube $q$ screw-threaded on the outside. $r$ is a knob, provided on the inside with a screw thread and with a hole through which is inserted the electric or other wire $s$, cord or the like. It will be seen that it is only necessary to pass the wire $s$ through the hole in the knob and after inserting the end into the split tube $q$, to screw on the knob, when the wire is firmly clamped in position.

At Fig. 9 the pin $f$ is shown formed with a terminal $t$ of known type. It is of course understood that in place of providing the hole in the side and the clamping screw at the top, the positions may be reversed.

Fig. 10 shows a form of the pin portion of the device in which a screw $u$ is formed at the top of the pin $f$. In this case a milled flange $w$ is provided to enable the screw $u$ to be easily inserted, although other means may be adapted for this purpose.

Figs. 11, 12 and 13 show respectively the pin $f$ provided with a loose ring 2, a hook 3 and a flattened ring-like washer 4.

At Fig. 14 the cap $c$ is provided with two notches 5 in which a special screw driver can engage. In this case a spring such as $k$ is provided beneath the cap.

It will be understood that in general the pin portion $f$ may be provided with any other suitable device by means of which the said portion can carry or have connected or attached thereto an article of any description or by means of which it can form a connection between any two things.

In place of the cap covering the whole of the top of the screw or nail it may only cover a portion thereof.

In applying the device to electrical uses any other means may be adopted for attaching the wire or the like to the pin portion, such for example as soldering the wire to the pin, forming the pin with plates, between which the end of the wire is clamped. Any suitable electrical connection may also be made with the screw portion of the device for the return wire.

The device is especially useful in cases where it is desired to be able to fasten and unfasten covers of chairs or other articles of furniture, the nail or screw being inserted into the frame and the pin portion passed through the material of the cover into the hole in the nail or screw portion, it being understood that the pin is provided with a head in this case.

What I claim as my invention and desire to secure by Letters Patent of the United States of America is:—

1. A fastening having a bore therein, spring means associated with said fastening, a pin having a groove therein receivable into the bore in said fastening, the groove in said pin adapted to engage said spring means whereby said pin may be effectually held in place.

2. A headed fastening having a bore therein proceeding inwardly from the head in a direction longitudinally of said fastening, a spring cap fitted about the head having a perforation therein, and a pin having a groove therein adapted to be passed through the perforation in said cap and be received into the bore in the fastening, the groove in said pin adapted to be engaged by said spring cap, whereby said pin may be securely held in place.

3. A fastening device comprising a screw or nail provided with a head and a central bore, a spring fitted in the head of the screw or nail and a pin adapted to be passed through a slot in a cap on the screw or nail and into the central bore in the screw or nail and to be retained in position by the beforementioned spring and carrying or connecting means attached or formed with the pin.

4. A headed fastening having a bore therein proceeding inwardly from the head in a direction longitudinally of said fastening, the headed portion of said fastening also having a recess therein of greater diameter than said bore and communicating therewith, a spring member fitted in the recess and projecting slightly into the bore, a cap embracing the head of said fastening having a perforation therein adapted to aline with the bore, a headed pin having grooves therein spaced from the head, said pin adapted to be passed through the perforation in said cap and be received into the bore in said fastening, one of the grooves in said pin adapted to be engaged by said spring member whereby said pin may be securely locked in place, and carrying or connecting means attached or formed with said pin.

In testimony whereof, I affix my signature, in presence of two witnesses.

KATE DRUSILLA STEVENSON.

Witnesses:
A. E. VIDAL,
L. SIMMOND.